United States Patent
Geraets

(10) Patent No.: US 10,486,577 B1
(45) Date of Patent: Nov. 26, 2019

(54) HYDRAULIC TAIL TRAILER

(71) Applicant: Patrick A. Geraets, Mitchell, SD (US)

(72) Inventor: Patrick A. Geraets, Mitchell, SD (US)

(73) Assignee: TRAIL-EZE, INC., Mitchell, SD (US)

( * ) Notice: Subject to any disclaimer, the term of this patent is extended or adjusted under 35 U.S.C. 154(b) by 113 days.

(21) Appl. No.: 15/874,133

(22) Filed: Jan. 18, 2018

(51) Int. Cl.
*B60P 1/43* (2006.01)

(52) U.S. Cl.
CPC ...................................... *B60P 1/43* (2013.01)

(58) Field of Classification Search
CPC .. B60P 1/43; B60P 1/431; B60P 1/433; B60P 1/445; B60P 3/06; B60P 3/062; B60P 3/064; B60P 3/07; B62D 53/062; B62D 53/065; B62D 53/067; B61D 47/005; B65G 67/04
USPC ............ 293/118; 403/102; 14/71.3; 414/558, 414/546, 480, 556, 656
See application file for complete search history.

(56) References Cited

U.S. PATENT DOCUMENTS

| | | | | |
|---|---|---|---|---|
| 2,248,080 A | * | 7/1941 | Hathaway | B60P 3/11 180/906 |
| 2,318,802 A | * | 5/1943 | Reid | B60P 3/062 180/906 |
| 2,900,094 A | * | 8/1959 | Ferguson | B60P 1/43 193/41 |
| 5,490,754 A | * | 2/1996 | Voelzke | B60P 1/433 14/71.7 |
| 7,547,178 B1 | | 6/2009 | Dierks et al. | |
| 7,658,587 B1 | * | 2/2010 | Dierks | B60P 1/43 280/790 |
| 9,315,138 B1 | | 4/2016 | Dierks et al. | |

* cited by examiner

*Primary Examiner* — Glenn F Myers
(74) *Attorney, Agent, or Firm* — Dennis L. Thomte; Thomtw Patent Law Office LLC

(57) ABSTRACT

A hydraulic tail trailer comprising a main deck having a main tail assembly and a flip tail assembly. The flip tail assembly is pivotally movable with respect to the main tail assembly between a stowed position and an operative position. A flip tail locking assembly is provided for locking the flip tail assembly in its stowed position.

2 Claims, 4 Drawing Sheets

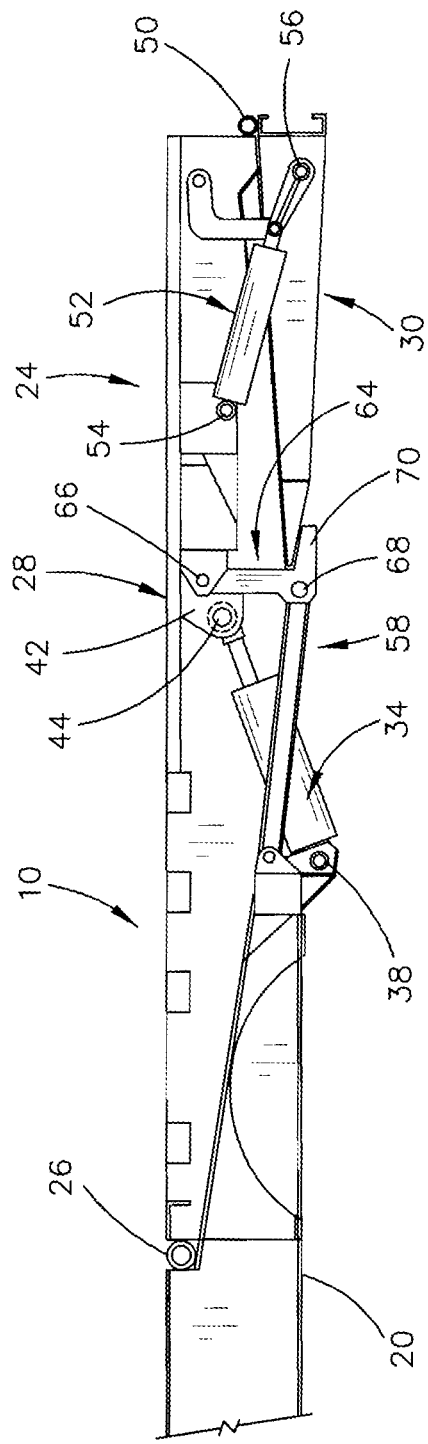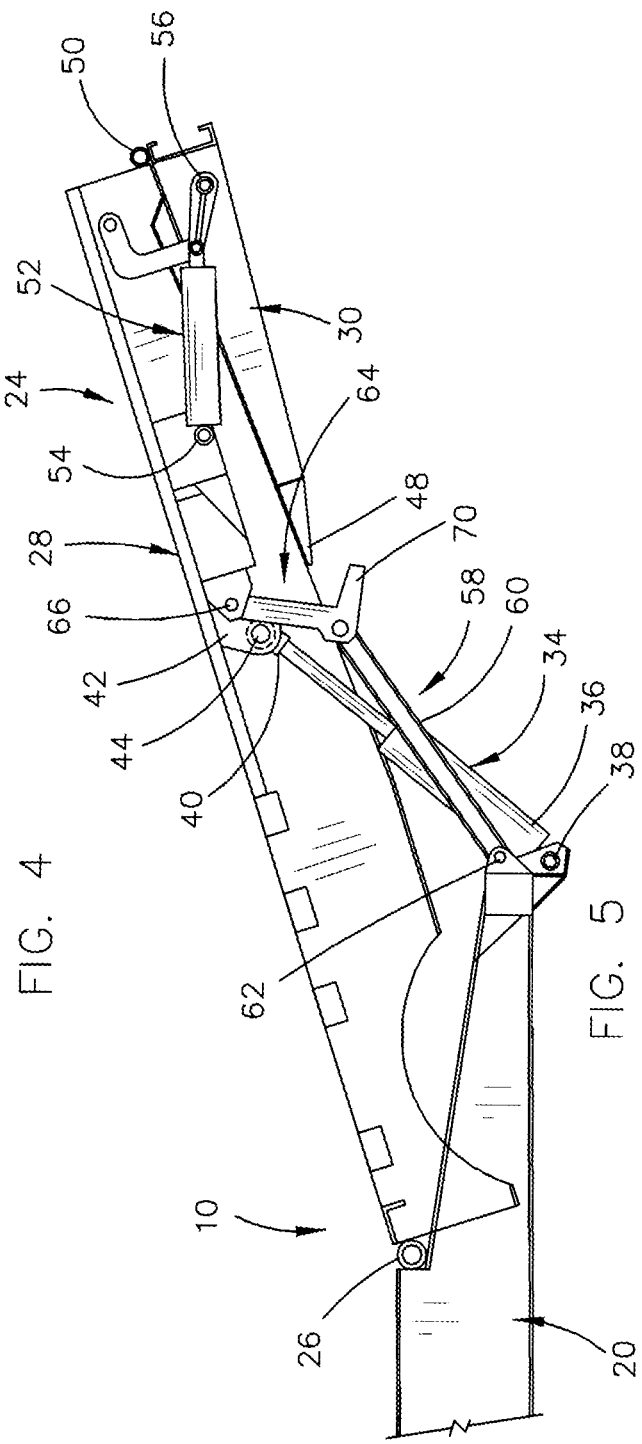

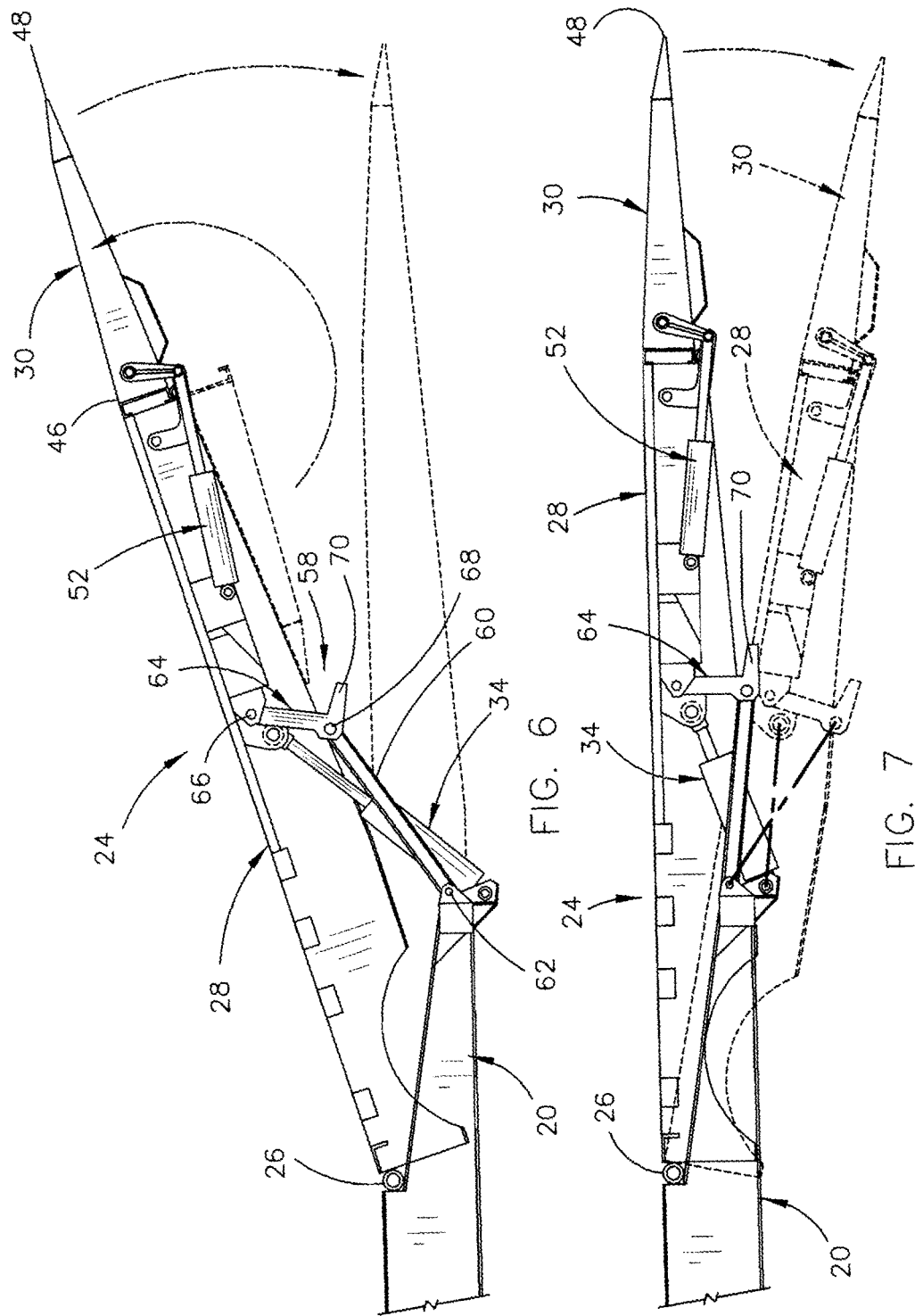

HYDRAULIC TAIL TRAILER

BACKGROUND OF THE INVENTION

Field of the Invention

This invention relates to a hydraulic tail trailer including a tail assembly which is pivotally secured to the frame means of the trailer at the rearward end thereof. More particularly, this invention relates to a tail assembly which includes a main tail and a flip tail with the flip tail being selectively movable between a stowed position beneath the rearward end of the main tail to an extended operative position. Even more particularly, this invention relates to a locking device which prevents the flip tail from moving from its stowed position to its extended operative position until the main tail has been pivotally moved from its operative position to its upper position.

Description of the Related Art

Applicant has previously patented hydraulic tail trailers which have a pivotal tail assembly at the rearward end of the main deck of the trailer to enable large machinery or equipment to be loaded onto the trailer. See for example, U.S. Pat. Nos. 9,315,138; 7,547,178; and 7,658,587. In each of those patents, a main tail is selectively pivotally secured to the frame means of the trailer at the rearward end of the main deck. In each of those patents, a flip tail is selectively pivotally secured to the rearward end of the main tail between stowed and operative positions. In the stowed position, the flip tail is positioned beneath the rearward end of the main tail. In each of those patents, the flip tail is pivotally movable between the stowed and operative positions by a hydraulic cylinder. If the hydraulic cylinder should fail, the flip tail could pivotally move downwardly from its stowed position and strike the roadway. In Applicant's U.S. Pat. No. 7,547,178, an unnumbered hydraulic cylinder controlled the operation of a locking mechanism 89. Should that hydraulic cylinder fail, the flip tail could pivot downwardly and strike the roadway.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hydraulic tail trailer is disclosed which includes a frame means having forward and rearward ends. Front and rear wheel suspension systems are secured to the frame means. A main deck is mounted on the frame means and has rearward and forward ends. The trailer includes a tail assembly having rearward and forward ends with the forward end of the tail assembly being pivotally secured to the frame means at the rearward end of the frame means.

The tail assembly includes a main tail, having a rearward end, a forward end, an upper end, and a lower end and further includes a flip tail having a rearward end, a forward end, an upper end, and a lower end, with the forward end of the flip tail being pivotally secured to the rearward end of the main tail. The flip tail is pivotally movable from a stowed position beneath the main tail to an operative position.

A first hydraulic cylinder means is pivotally connected to the tail assembly for pivotally moving the tail assembly between a first position wherein the mail tail is parallel to the main deck, to a second upwardly extending position with respect to the main deck and to a third downwardly extending position with respect to the main deck. A second hydraulic cylinder means is secured to the flip tail for moving the flip tail between its stowed position and its operative position.

A flip tail locking assembly is provided for locking the flip tail in its stowed position when said main tail is in its first position. The flip tail locking assembly includes an elongated first arm having a forward end and a rearward end with the forward end of the first arm being operatively pivotally secured to the frame means at the rearward end of the frame means. The flip tail locking assembly also includes an elongated second arm having an upper end and a lower end with the lower end of the second arm being pivotally secured to the rearward end of the first arm. The upper end of the second arm is pivotally secured to the main tail. The lower end of the second arm includes a locking bar which extends rearwardly therefrom and which is generally transversely disposed with respect to the longitudinal axis of the second arm. The locking bar is positioned below the rearward end of the flip tail, when the flip tail is in its stowed position and the main tail is in its first position to prevent the flip tail from pivotally moving downwardly with respect to the main tail in the event of a failure of the second hydraulic cylinder means. The locking bar is spaced from the rearward end of the flip tail when the tail assembly is in its second position to permit the flip tail to be pivotally moved from its stowed position to its operative position.

It is therefore a principal object of the invention to provide an improved hydraulic tail trailer.

A further object of the invention is to provide an improved hydraulic tail trailer which includes a locking assembly for maintaining the flip tail thereof in its stowed position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a partial side view illustrating the main tail in its operative position and the flip tail in its stowed position with the locking device of this invention preventing the flip tail from moving from its stowed position;

FIG. 5 is a view similar to FIG. 4 except that the main tail has been pivotally moved upwardly to its elevated position;

FIG. 6 is a partial side view similar to FIG. 5 except that the flip tail has been pivotally moved from its stowed position to an extended operative position; and FIG. 7 is a partial side view illustrating the main tail and flip tail in a horizontal position with the broken lines illustrating main tail and flip tail in an unloading/loading position.

DESCRIPTION OF THE PREFERRED EMBODIMENT

Figure 1:
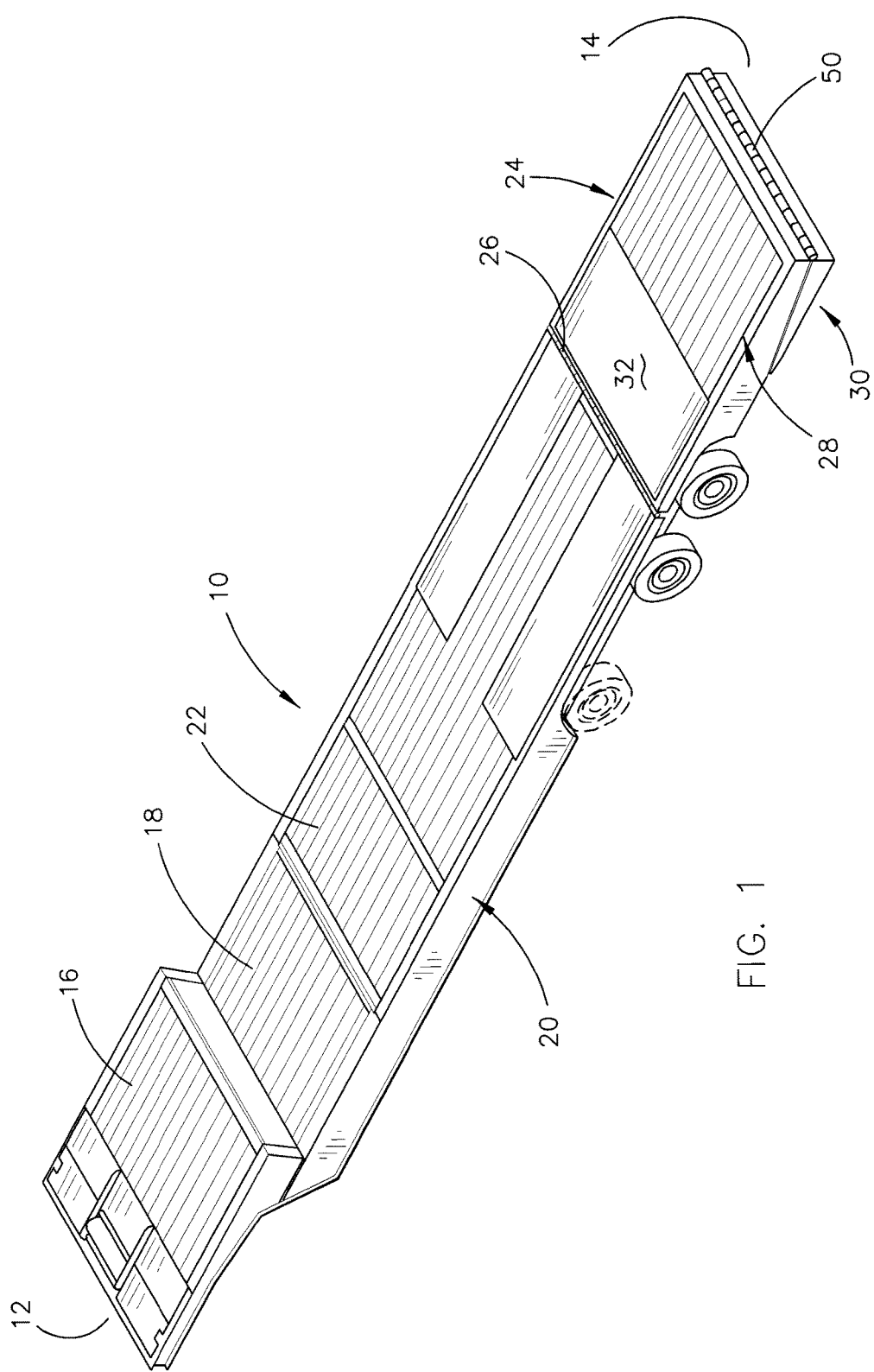
FIG. 1 is a rear perspective view of the hydraulic tail trailer of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The hydraulic tail trailer of this invention is referred to generally by the reference numeral 10 and includes a forward end 12 and a rearward end 14. Except for the flip tail locking assembly, as will be explained in detail hereinafter, the trailer 10 may be constructed as shown in U.S. Pat. No. 9,315,138. The disclosure of U.S. Pat. No. 9,315,138 is incorporated herein by reference thereto to complete this disclosure if necessary.

Trailer 10 may have a conventional upper deck section 16 and a hydraulically operated upper deck ramp 18 of conventional design. A king pin (not shown) is provided at the underside of the forward end of the trailer to enable the trailer to be connected to a prime mover such as a truck having a fifth wheel assembly mounted thereon. Trailer 10 includes a wheeled frame means 20. The numeral 22 refers to a main deck which is supported on the wheeled frame means 20 as described in U.S. Pat. No. 9,315,138.

The numeral 24 refers to a hydraulic tail assembly, as disclosed in U.S. Pat. No. 7,547,178, the disclosure of which is incorporated herein by reference thereto to complete this disclosure if necessary. Tail assembly 24 is pivotally secured to the rearward end of main deck 22 by hinge 26 and which includes a main tail 28 and a flip tail 30. Main tail 28 is provided with a deck 32 positioned thereon.

A hydraulic cylinder 34 has its base end 36 pivotally secured to the rearward end of frame means 20 by a pivot pin 38. The rod end 40 of hydraulic cylinder 34 is pivotally secured to bracket 42, which is secured to main tail 28, by a pivot pin 44. Usually there will be a pair of the hydraulic cylinders 34 although the drawings show a single hydraulic cylinder 34.

Figure 3:
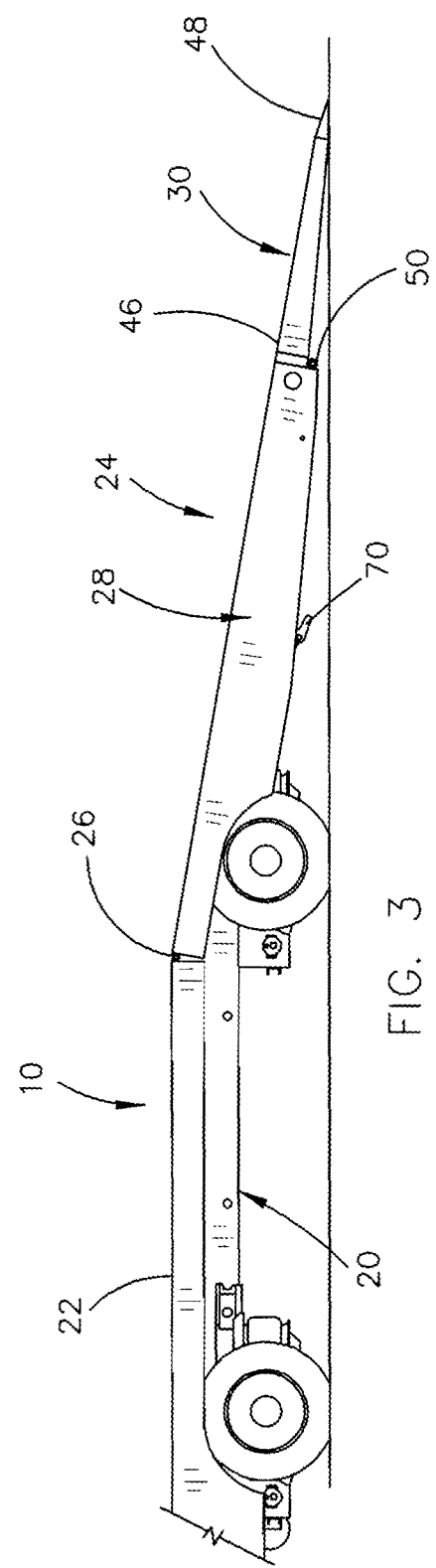
FIG. 3 is a partial side view of the trailer of this invention with the main tail and flip tail of the trailer being in their operative loading positions.

When the hydraulic cylinders 34 are in the semi-retracted position of FIG. 4, the main tail 28 will be in the horizontally disposed operative position. When the hydraulic cylinders 34 are in the extended position of FIG. 5, the main tail 28 will extend upwardly from the rearward end of the frame means 20. When the cylinder or cylinders 34 are in their fully retracted position of FIG. 7, the tail assembly 24 will be in the loading or unloading position of FIG. 3.

Flip tail 30 will be described as having a forward end 46 and a rearward end 48. The forward end 46 of flip tail 30 is pivotally secured to the rearward end of main tail 28 by a hinge 50. The numeral 52 refers to a hydraulic cylinder 52 which has its base end pivotally secured to main tail 28 by a pivot pin 54. The rod end of hydraulic cylinder 52 is pivotally connected to flip tail 30 at 56 in conventional fashion. Usually, the flip tail 30 will be pivoted with respect to main tail 28 by a pair of hydraulic cylinders 52. The hydraulic cylinder or cylinders 52 are configured to pivotally move the flip tail 30 between the stowed position of FIG. 2 to the extended and operative loading and unloading position of FIG. 3.

Figure 2:
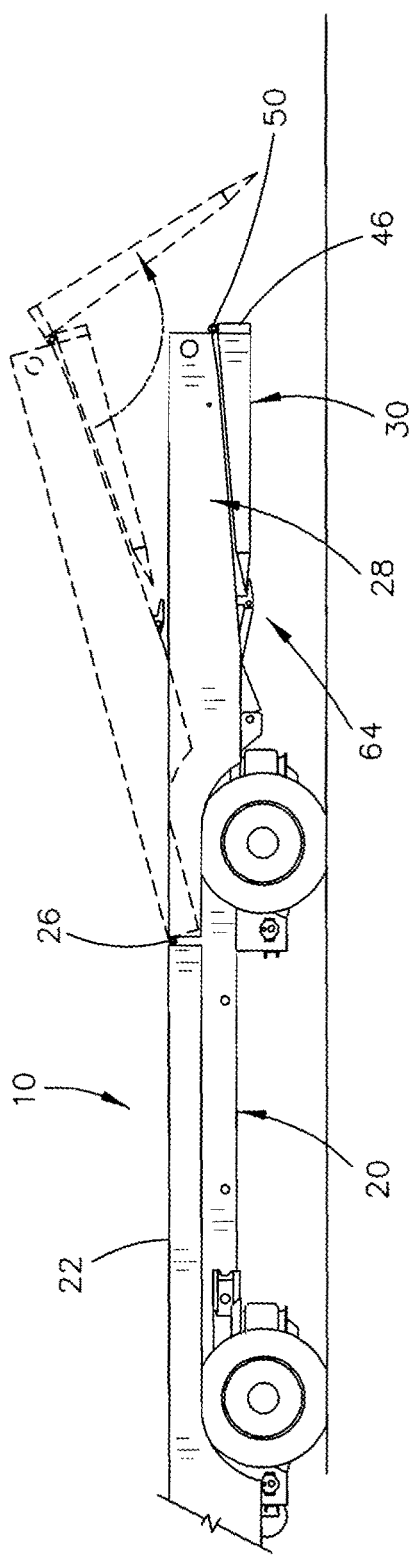
FIG. 2 is a partial side view of the trailer of this invention with the broken lines illustrating the main tail in its elevated position and the flip tail being pivotally moved from its stowed position to its operative extended position.

The numeral 58 refers to the flip tail locking assembly of this invention which locks the flip tail 30 in its stowed position when the tail assembly 24 is in its horizontally disposed position of FIGS. 2 and 7. Locking assembly 58 includes an elongated arm or bar 60 which has its forward end pivotally secured to frame means 20 by a pivot pin 62. Locking assembly 58 also includes a generally L-shaped member 64 which has its upper end pivotally secured to main tail 28 by a pivot pin 66. The rearward end of arm 60 is pivotally connected to member 64 by a pivot pin 68. Member 64 defines a locking bar 70 which extends rearwardly therefrom. When the tail assembly 24 is in the operative transport position of FIG. 4, the locking bar 70 is positioned below the rearward end 48 of flip tail 30 to prevent the flip tail 30 from moving downwardly from its stowed position and striking the roadway should the hydraulic cylinder or cylinders 52 fail.

As the tail assembly 24 is pivotally moved from its operative position of FIG. 4 to its raised position of FIG. 5 by the hydraulic cylinders 34, the locking bar 70 moves out of engagement with the rearward end 48 of flip tail 30. The hydraulic cylinders 52 may then be extended to pivotally move the flip tail 30 from its stowed position of FIG. 5 to the extended operative position of FIG. 6. The tail assembly 24 may then be pivotally moved from its position of FIG. 6 to its lowered loading and unloading position of FIG. 3.

Thus it can be seen that a unique flip tail locking assembly has been provided for locking the flip tail 30 in its stowed position should the hydraulic cylinders 52 fail.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A hydraulic tail trailer, comprising:
a frame means having forward and rearward ends;
front and rear wheeled suspension systems secured to said frame means;
a main deck mounted on said frame means and having rearward and forward ends;
a tail assembly having rearward and forward ends;
said forward end of said tail assembly being pivotally secured to said frame means at the rearward end of said frame means;
said tail assembly including a main tail, having a rearward end, a forward end, an upper end, and a lower end and further including a flip tail having a rearward end, a forward end, an upper end and a lower end with said forward end of said flip tail being pivotally secured to said rearward end of said main tail;
said flip tail being pivotally movable from a stowed position beneath said main tail to an operative position;
a first hydraulic cylinder means pivotally connected to said tail assembly for pivotally moving said tail assembly between a first position wherein said main tail is parallel to said main deck, to a second upwardly extending position with respect to said main deck and to a third downwardly extending position with respect to said main deck;

a second hydraulic cylinder means secured to said flip tail for pivotally moving said flip tail between said stowed position and said operative position;

a flip tail locking assembly for locking said flip tail in its said stowed position when said main tail is in its said first position, comprising:
  (a) an elongated first arm having a forward end and a rearward end;
  (b) said forward end of said first arm being operatively pivotally secured to said frame means at said rearward end of said frame means;
  (c) an elongated second arm having an upper end and a lower end;
  (d) said lower end of said second arm being pivotally secured to said rearward end of said first arm;
  (e) said upper end of said second arm being pivotally secured to said main tail;
  (f) said lower end of said second arm having a locking bar extending rearwardly therefrom which is generally transversely disposed with respect to the longitudinal axis of said second arm;

said locking bar being positioned below said rearward end of said flip tail, when said flip tail is in said stowed position and said main tail is in said first position to prevent said flip tail from pivotally moving downwardly with respect to said main tail in the event of a failure of said second hydraulic cylinder means; and said locking bar being spaced from said rearward end of said flip tail when said tail assembly is in said second position to permit said flip tail to be pivotally moved from its stowed position to its said operative position.

2. A hydraulic tail trailer, comprising:
a frame means having forward and rearward ends;
front and rear wheeled suspension systems secured to said frame means;
a main deck mounted on said frame means and having rearward and forward ends;
a tail assembly having rearward and forward ends;
said forward end of said tail assembly being pivotally secured to said frame means at the rearward end of said frame means;
said tail assembly including a main tail, having a rearward end, a forward end, an upper end, and a lower end and further including a flip tail having a rearward end, a forward end, an upper end and a lower end with said forward end of said flip tail being pivotally secured to said rearward end of said main tail;
said flip tail being pivotally movable from a stowed position beneath said main tail to an operative position;
a first hydraulic cylinder means pivotally connected to said tail assembly for pivotally moving said tail assembly between a first position wherein said main tail is parallel to said main deck, to a second upwardly extending position with respect to said main deck and to a third downwardly extending position with respect to said main deck;
a second hydraulic cylinder means secured to said flip tail for pivotally moving said flip tail between said stowed position and said operative position;
a mechanical flip tail locking assembly for mechanically locking said flip tail in its said stowed position when said main tail is in its said first position;
said mechanical flip tail locking assembly being configured to permit said flip tail to pivotally move from its said stowed position to its said operative position when said main tail is in said second position.

\* \* \* \* \*